G. SYVERSON.
RUNNER FOR GO-CARTS.
APPLICATION FILED FEB. 4, 1911.

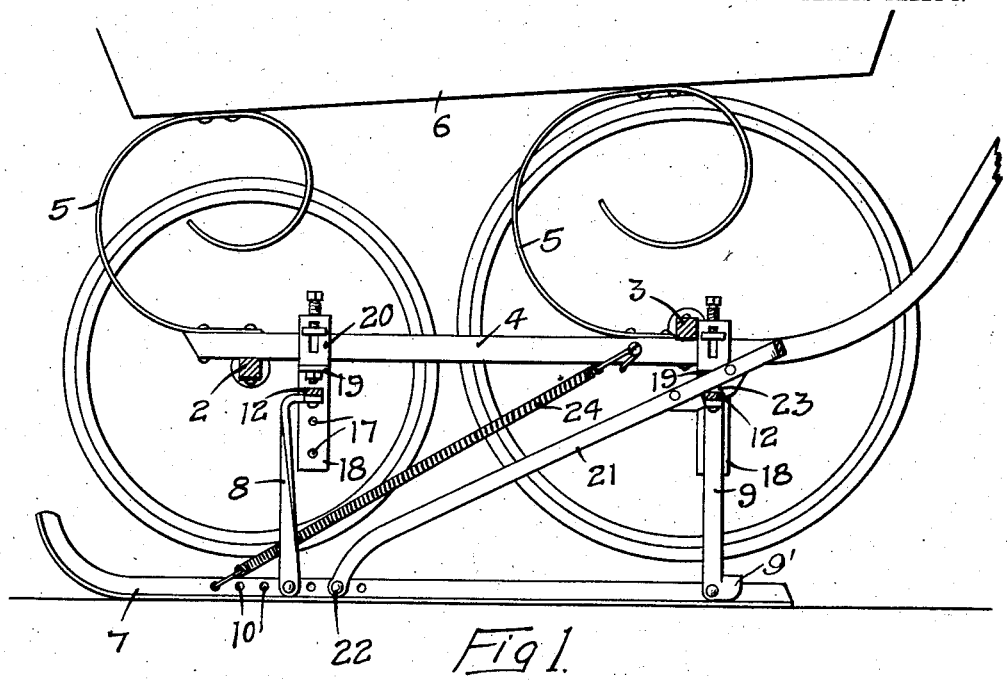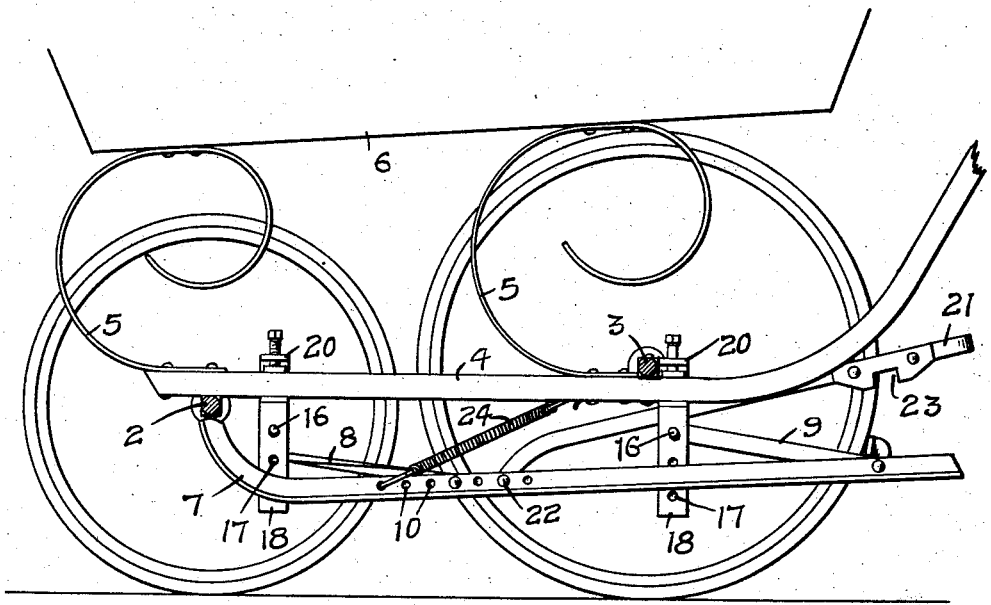

1,027,224.

Patented May 21, 1912.

2 SHEETS—SHEET 2.

WITNESSES

INVENTOR
GILFRED SYVERSON
BY Paul & Paul
ATTORNEYS

UNITED STATES PATENT OFFICE.

GILFRED SYVERSON, OF GLENWOOD, MINNESOTA.

RUNNER FOR GO-CARTS.

1,027,224.

Specification of Letters Patent.

Patented May 21, 1912.

Application filed February 4, 1911. Serial No. 606,622.

*To all whom it may concern:*

Be it known that I, GILFRED SYVERSON, of Glenwood, Pope county, Minnesota, have invented certain new and useful Improvements in Runners for Go-Carts, of which the following is a specification.

The object of my invention is to provide runners adapted for attachment to any style or size of go-cart, with means for easily and quickly raising the runners to an inoperative position or lowering them to a position where the wheels will be lifted clear of the ground.

A further object is to provide a simple inexpensive construction and one that will be strong and durable.

The invention consists generally in various constructions and combinations, all as hereinafter described and particularly pointed out in the claims.

Figure 3:
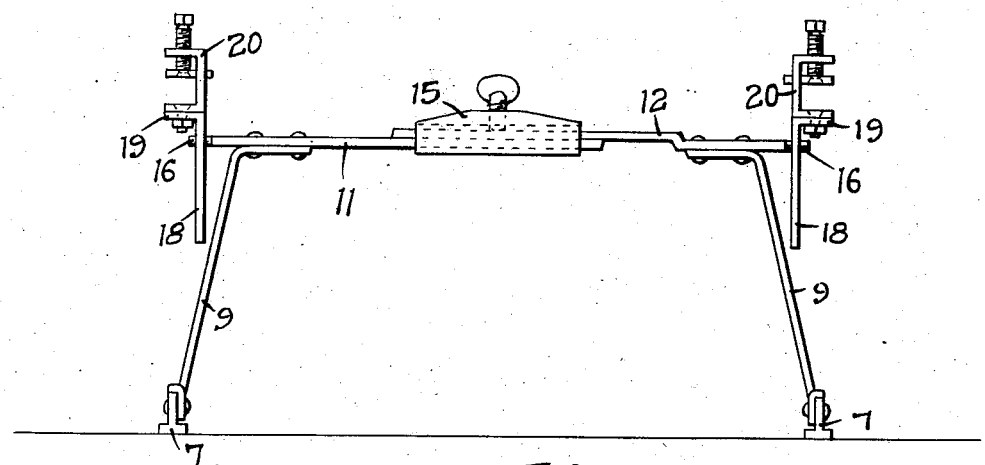
Figure 4:
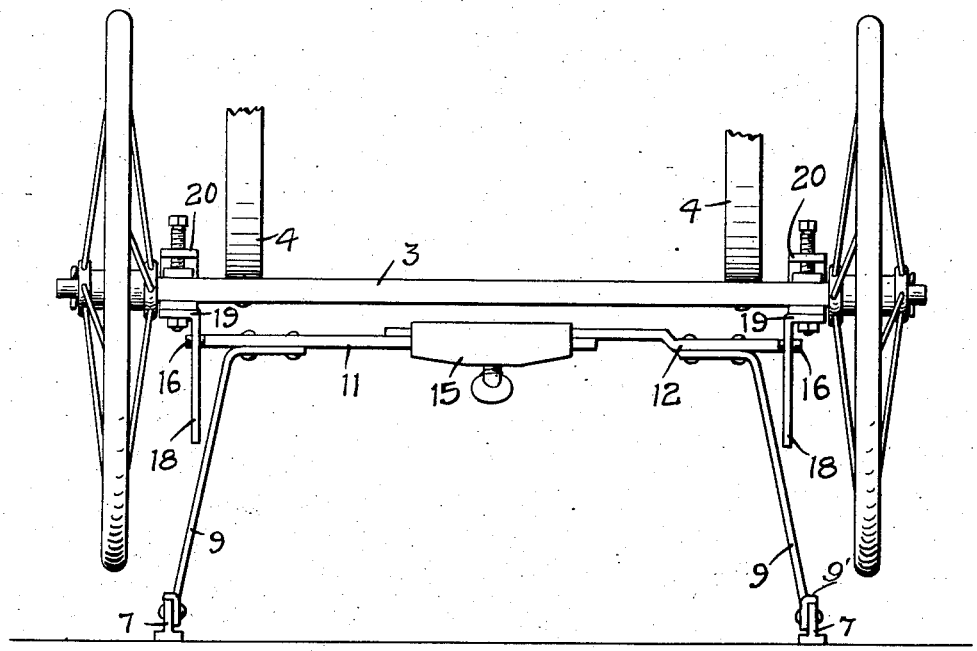

In the accompanying drawings forming part of this specification, Figure 1 is a sectional view illustrating the application of my invention to a go-cart, the runners being shown in their lowered or operative position, Fig. 2 is a similar view, showing the runners in their raised position, Fig. 3 is an end view, illustrating the device detached from the go-cart, Fig. 4 is a similar view, showing the manner of attaching the device to the rear axle of the cart.

In the drawing, 2 and 3 represent, respectively, the forward and rear axles of the go-cart, secured to the longitudinal side rails 4 whereon the springs 5 supporting the cart body 6 are mounted.

7 represents the runners, 8 the forward knees and 9 the rear knees, the forward knees being adjustably connected with the runners through holes 10 provided at suitable intervals. Bars 11 and 12 have their outer ends secured to the inwardly turned upper portions of the knees 8 and similar bars are secured at their outer ends to the inwardly turned portions of the knees 9 and are adapted to oscillate forwardly and backwardly therewith. The bars 11 and 12 have their inner ends lapping by one another and are secured together by a clamp 15 and a similar clamp (not shown) secured the lapping ends of the corresponding bars at the forward ends of the runners. These clamps permit endwise adjustment of the bars and adapt the runners to axles of different length and collapsible go-carts of different sizes. The ends of the bars 11 and 12 extend outwardly beyond their supporting knees, terminating in pins 16 which are adapted to enter holes 17 provided in vertically arranged brackets 18. The upper ends of these brackets have outwardly turned horizontal extensions 19 upon which clamps 20 are swiveled. These clamps are capable of revolution on their supports to adapt them for engagement with the side rails 4 or with the axles of the car, as may be desired.

In Fig. 1, I have shown the rear clamps engaging the side rails 4 and in Fig. 4 I have illustrated the same clamps adjusted to engage the rear axle. The function of these clamps is substantially the same, whether they are in engagement with the rails of the cart or with the axles. The holes in the brackets are uniformly spaced, as indicated, and the vertical adjustment of the brackets on the pins 16 adapt them and the runners for wheels of different sizes. For some carts the brackets may be set in the position indicated in Fig. 4, thereby lifting the wheels out of contact with the ground, and for other styles of carts it may be necessary to raise the brackets one or more holes to render the runners operative.

As usual in devices of this kind, the runners swing up to a position near the side rails of the cart, as shown in Fig. 2, and for the purpose of locking them in their depressed operative position I provide a bail 21 pivoted at 22 to the runners and having notches 23 to engage the rear cross bars 11 and 12. Coiled springs 24 connect the side rails of the cart with the runners and are put under tension when the runners are lowered to lift them to their operative position when the bail 21 is released. I prefer also to provide lugs 9 in connection with the rear knees to prevent the runners from slipping forward, up under the cart, the lugs engaging the tops of the runners, as shown plainly in Figs. 1, 3 and 4.

The device may be used with go-carts having axles extending transversely or with carts having only the side rails or bars. When the device is used with a cart having axles it will be mounted, as shown in Fig. 4, the clamps being adjusted to engage the axles. When, however, the cart is not provided with axles the clamps will be arranged as shown in Fig. 3, where they will clamp the side rails and support the runners thereon. This manner of mounting the clamps is also illustrated in Figs. 1 and 2. It will be understood, therefore, that by a simple adjustment of the clamps the device is made applicable to a cart having axles or one having only the side bars.

In various ways the details of construction shown herein may be modified without departing from the spirit of my invention.

I claim as my invention:—

1. The combination, with a go-cart having forward and rear axles and carrying wheels and longitudinal side rails whereon said axles are mounted, of runners and knees therefor, cross bars secured to said knees, brackets mounted on said cross bars and clamps having a horizontal jaw swiveled on said brackets and adapted to engage either said forward and rear axles or said side rails.

2. The combination, with the forward and rear axles and carrying wheels, and longitudinal side rails whereon said axles are mounted, of runners and knees pivotally connected thereto, cross bars secured to said knees, brackets carried by said cross bars and having horizontal extensions at their upper ends, and clamps having lower horizontal jaws provided with vertical pivots on said extensions and adapted to rotate thereon and engage either said forward and rear axles or said side rails.

3. The combination, with a go-cart having forward and rear axles and longitudinal side rails whereon said axles are mounted, of runners, knees having their lower ends pivotally secured to said runners and provided with inwardly turned upper ends, bars having their outer ends secured to the inwardly turned upper portions of said knees, the inner ends of said bars lapping by one another, a clamp embracing the lapping ends of said bars and permitting endwise adjustment thereof to increase or decrease the distance between said runners, the outer ends of said bars projecting beyond said knees and axle engaging clamps carried by said projecting ends.

4. The combination, with a go-cart having forward and rear axles and longitudinal side rails whereon said axles are mounted, of runners and knees therefor, bars secured to the upper portions of said knees and having outwardly projecting ends, brackets having vertical portions provided with holes arranged one above another to receive the projecting ends of said bars, the upper portions of said brackets having horizontal extensions and clamps swiveled on said horizontal extensions and adapted to engage said axles or said side rails.

5. The combination, with a go-cart having forward and rear axles and longitudinal side rails whereon said axles are mounted, of runners and knees therefor, the lower portions of said knees being pivotally connected with said runners, transverse bars secured to the upper portions of said runners, clamps supported by said transverse bars and adapted to engage said axles, a bail pivotally connected to said runners and having notches therein adapted to receive said rear cross bars, forward endwise pressure on said bail operating to swing said runners downwardly to a working position, and springs connecting the forward portions of said runners with said rails and put under tension by the movement of said bail to its locking position.

6. The combination, with the forward and rear axles and carrying wheels therefor, of runners, knees mounted thereon, cross bars secured to said knees and having their ends projecting horizontally beyond said knees, vertical brackets having holes therein, one above another, adapted to receive the ends of said cross bars and thereby vertically adjustable thereon, and axle engaging clamps carried by the upper portions of said brackets.

7. The combination, with a go-cart having forward and rear axles and carrying wheels, and side rails whereon said axles are mounted, said side rails supporting the go-cart body and forming a permanent part of the go-cart, of cross bars secured to said knees, and clamps supported by said cross bars and adapted to engage said side rails to secure said cross bars and runners to the go-cart, substantially as described.

8. The combination, with a go-cart having forward and rear axles and longitudinal side rails whereon said axles are mounted, of runners and knees therefor, and swivel clamps connected with said knees and having vertical pivots and rotating freely thereon to engage either said axles extending transversely of said go-cart or said side rails extending lengthwise thereof, for the purpose specified.

In witness whereof, I have hereunto set my hand this 26th day of January, 1911.

GILFRED SYVERSON.

Witnesses:
HENRY T. RONNING,
FRANK E. REED.